United States Patent
Sawyer et al.

[15] 3,684,935
[45] Aug. 15, 1972

[54] CIRCUIT FOR DISSIPATING THE POTENTIAL INDUCED IN EACH PHASE WINDING OF A CYCLOCONVERTER OPERATED MOTOR UPON TERMINATION OF CONDUCTION THERETHROUGH

[72] Inventors: Elbert M. Sawyer, Torrance, Calif.; William M. Haas, Anderson, Ind.

[73] Assignee: General Motors Corporation, Detroit, Mich.

[22] Filed: July 2, 1971

[21] Appl. No.: 159,228

[52] U.S. Cl............318/227, 317/DIG. 6, 318/230, 318/231, 321/5, 321/69
[51] Int. Cl.............................................H02p 5/40
[58] Field of Search....318/227, 230, 231; 321/5, 69; 317/DIG. 6

[56] References Cited

UNITED STATES PATENTS

| 3,603,866 | 9/1971 | Opal | 318/227 |
| 3,617,838 | 11/1971 | Brandt | 318/227 |
| 3,624,472 | 11/1971 | Graham | 318/227 |

*Primary Examiner*—Gene Z. Rubinson
*Attorney*—Eugene W. Christen et al.

[57] ABSTRACT

A circuit for dissipating the potential induced in each phase winding of a cycloconverter operated alternating current motor upon the termination of conduction therethrough. The anode-cathode electrodes of each of two oppositely poled silicon controlled rectifiers are connected in series with a respective parallel combination of a resistor and a capacitor across each phase winding of the motor. When conduction through each phase winding in either direction is to be terminated, a gate signal is produced and applied across the gate-cathode electrodes of the one of the silicon controlled rectifiers connected across the phase winding through which conduction is to be terminated which is forward poled by the potential induced in the phase winding as the magnitude of phase current flow therethrough decreases.

4 Claims, 5 Drawing Figures

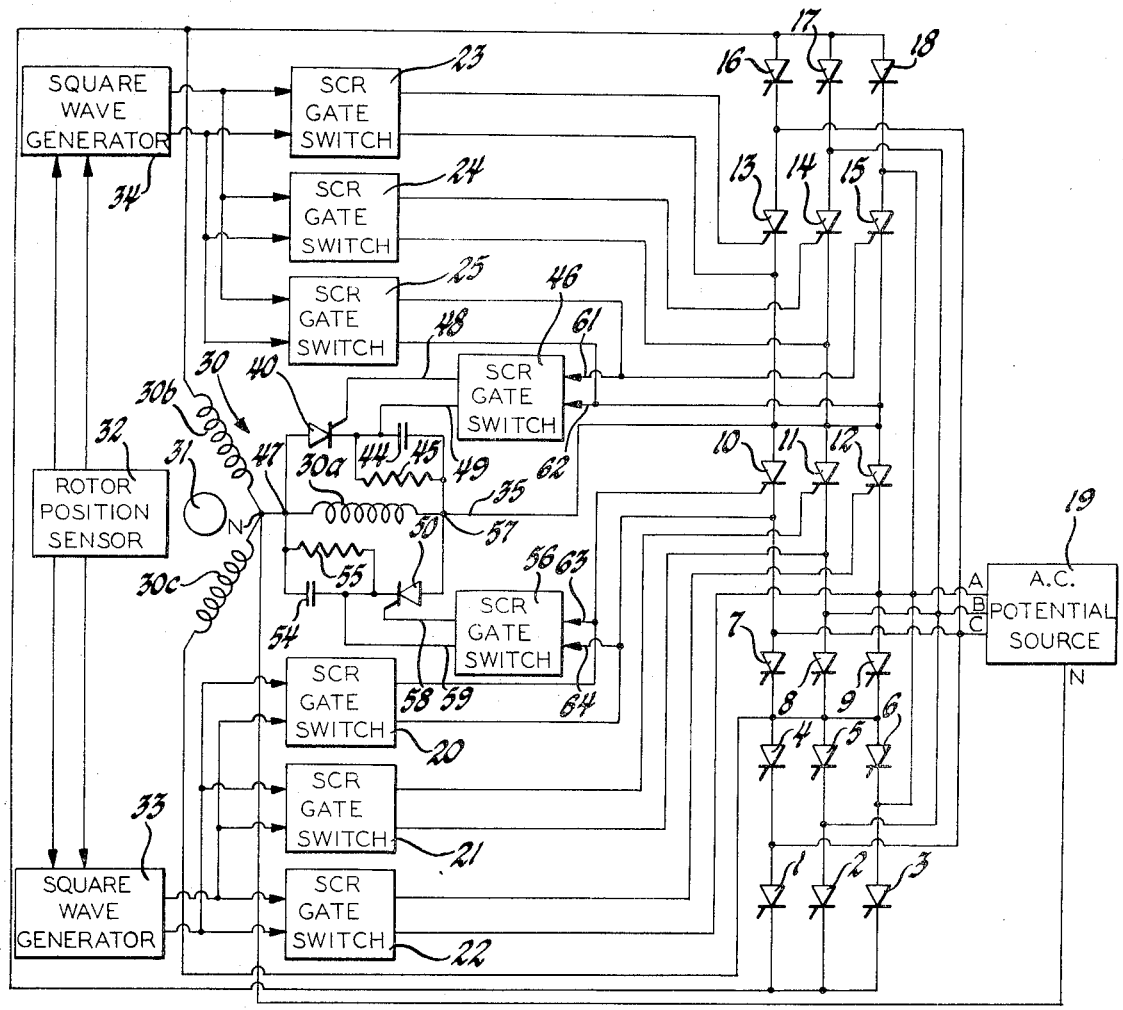
Fig.1
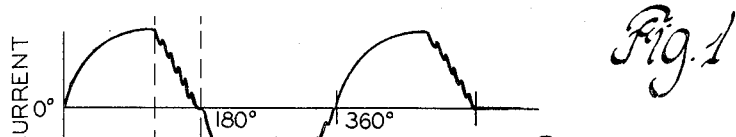
Fig.2a
Fig.2b
GATE SIGNAL FOR
SILICON CONTROLLED
RECTIFIERS 13,14 & 15
Fig.2c
GATE SIGNAL FOR
SILICON CONTROLLED
RECTIFIER 40
Fig.2d
INVENTORS
Elbert M. Sawyer &
BY William M. Haas
Richard G. Stahr
ATTORNEY

CIRCUIT FOR DISSIPATING THE POTENTIAL INDUCED IN EACH PHASE WINDING OF A CYCLOCONVERTER OPERATED MOTOR UPON TERMINATION OF CONDUCTION THERETHROUGH

The invention herein described was made in the course of work under contract or subcontract thereunder with the Department of Defense.

This invention is directed to a circuit for dissipating the potential induced in each phase winding of a cycloconverter operated motor upon the termination of conduction therethrough.

In cycloconverter systems for cyclically energizing the phase windings of an alternating current motor from an alternating current supply potential source, each phase of the supply potential source supplies current to each phase winding of the motor in a first direction through a cycloconverter silicon controlled rectifier and in a second opposite direction through another oppositely poled cycloconverter silicon controlled rectifier. Consequently, for each phase of the alternating current supply potential source, there is a corresponding cycloconverter silicon controlled rectifier having the cathode electrode connected to one terminal end of each phase winding of the motor through which current is supplied thereto in a first direction and a corresponding cycloconverter silicon controlled rectifier having the anode electrode connected to the same terminal end of each phase winding of the motor through which current is supplied thereto in a second opposite direction. For example, with a three-phase cycloconverter system in which a three-phase alternating current motor is supplied from a three-phase supply potential source, the cathode electrode of each of three cycloconverter silicon controlled rectifiers, generally termed the common cathode group, and the anode electrode of each of three other cycloconverter silicon controlled rectifiers, generally termed the common anode group, are connected to the same terminal end of each phase winding of the motor. In operation, gate signals are simultaneously applied across and removed from the gate-cathode electrodes of all of the cycloconverter silicon controlled rectifiers of each group.

One factor which limits the amount of current supplied the motor, thus the torque produced by the motor, with cycloconverter systems is the energy stored in each phase winding of the motor at the time conduction therethrough is terminated. As the current supplied a phase winding of the motor begins to decrease when the alternating current supply potential magnitude decreases toward zero, the inductance of the phase winding tends to maintain phase current flow in the same direction. This will cause the phase current to continue to flow in the same direction even though the supply potential across the anode-cathode electrodes of the cycloconverter silicon controlled rectifier through which phase current is supplied is of a polarity which would normally commutate the cycloconverter silicon controlled rectifier OFF because the potential induced in the phase winding controls the net cycloconverter silicon controlled rectifier potential until the energy stored in the phase winding has decreased to a low value. At the conclusion of the conduction period through the group of cycloconverter silicon controlled rectifiers through which current is being supplied, this delay of the decay or fall or phase current, which may continue for several cycles of the supply potential depending upon the magnitude of the energy stored in the motor phase winding, delays the actual turn-off of the last conducting cycloconverter silicon controlled rectifier of the group at the time the gate signals are removed. Consequently, this device will continue to conduct until the energy stored in the phase winding of the motor has been dissipated. If this stored energy causes the phase current to persist, or hang on long enough, a line-to-line short, or fault, will be produced thereby at the 180° point when the gate signals are applied across the gate-cathode electrodes of the cycloconverter silicon controlled rectifiers of the group through which current is supplied in the opposite direction to that phase winding of the motor. To prevent the energy stored in each phase winding of the motor from causing a cycloconverter silicon controlled rectifier to hang on and create a line-to-line fault, it is necessary to accelerate the decay of phase current in each motor phase winding. This may be accomplished by dissipating the potential induced in each phase winding of the motor upon the termination of conduction therethrough. By rapidly dissipating this induced potential through the circuit of this invention, the maximum motor current and, consequently, the maximum motor torque, may be significantly increased without resulting in a line-to-line fault due to motor phase current persisting to or beyond the 180° point.

It is, therefore, an object of this invention to provide a circuit for dissipating the potential induced in each phase winding of a cycloconverter operated motor upon the termination of conduction therethrough.

In accordance with this invention, a circuit for dissipating the potential induced in each phase winding of a cycloconverter operated alternating current motor upon the termination of conduction therethrough is provided wherein the anode-cathode electrodes of each of two oppositely poled silicon controlled rectifiers are connected in series with a respective parallel combination of a resistor and a capacitor across each phase winding of the motor and a gate signal, produced when conduction through each phase winding in either direction is to be terminated, is applied across the gate-cathode electrodes of the one of the silicon controlled rectifiers connected across the phase winding of the motor through which conduction is to be terminated which is forward poled by the potential induced in the phase winding as current flow therethrough decreases.

For a better understanding of the present invention, together with additional objects, advantages and features thereof, reference is made to the following description and accompanying drawings in which:

FIG. 1 sets forth a typical cycloconverter system for cyclically energizing the phase windings of a three-phase, alternating current motor from a three-phase, alternating current supply potential source in block form with the circuit of this invention incorporated therein and set forth in schematic form.

FIGS. 2a, 2b, 2c and 2d are curves useful in understanding the circuit of FIG. 1.

Referring to FIG. 1 of the drawings, a typical cycloconverter system for cyclically energizing the phase windings of a three-phase, alternating current motor 30, having three "wye" connected phase windings 30a, 30b, and 30c and a rotor 31, from a three-phase, alternating current supply potential source 19, is set forth in block form. As the alternating current supply potential source may be any one of several well known in the art and, per se, forms no part of this invention, it has been indicated in FIG. 1 in block form. Phase windings 30a, 30b and 30c of motor 30 are cyclically energized through a cycloconverter circuit made up of a network of 18 silicon controlled rectifiers, referenced by the numerals 1 through 18, inclusive. Corresponding to each cycloconverter silicon controlled rectifier is a cycloconverter silicon controlled rectifier gate switch for producing a gate signal. In the interest of reducing drawing complexity, only six cycloconverter silicon controlled rectifier gate switches which correspond to respective cycloconverter silicon controlled rectifiers 10 through 15 are shown in block form in FIG. 1 and referenced by the numerals 20 through 25. Any one of the silicon controlled rectifier gate switches well known in the art which produce an output potential signal may be employed as these cycloconverter silicon controlled rectifier gate switches which, per se, form no part of this invention. So that cycloconverter silicon controlled rectifier gate signals may be applied to the proper cycloconverter silicon controlled rectifiers at the proper time, a rotor position sensor may be employed. The rotor position sensor may be of the type shown in the United States patents to Campbell et al., U.S. Pat. No. 3,320,565, and Huntzinger et al. U.S. Pat. No. 3,395,328, or to Kirk, U.S. Pat. No. 3,483,458, all of which are assigned to the assignee of this application. As the rotor position sensor, per se, forms no part of this invention, it has been illustrated in FIG. 1 in block form and referenced by the numeral 32. The output signal of each of the rotor position sensors may be applied to a respective square wave generator which may be conventional bistable multivibrator circuits which convert the rotor position sensor pulse into a square wave-form. The two square wave generators corresponding to the respective rotor position sensors for phase winding 30a are shown in block form in FIG. 1 and referenced by the numerals 33 and 34. Any bistable multivibrator circuit well known in the art may be employed as these square wave generators which, per se, form no part of this invention. The output of the square wave generators is applied to the six cycloconverter silicon controlled rectifier gate switches which correspond to the cycloconverter silicon controlled rectifiers through which motor phase winding 30a is energized. That is, the output of square wave generator 33 is applied to the cycloconverter silicon controlled rectifier gate switches 20, 21 and 22 which correspond to common anode group cycloconverter silicon controlled rectifiers 10, 11 and 12, respectively, and the output of square wave generator 34 is applied to the cycloconverter silicon controlled rectifier gate switches 23, 24 and 25 which correspond to common cathode group cycloconverter silicon controlled rectifiers 13, 14 and 15, respectively. With this arrangement, all of the cycloconverter silicon controlled rectifiers of the common anode group are simultaneously triggered and all of the cycloconverter silicon controlled rectifiers of the common cathode group are simultaneously triggered.

In cycloconverter systems of this type, two square wave generators and six cycloconverter silicon controlled rectifier gate switches interconnected as shown in FIG. 1 for phase winding 30a of motor 30 are employed for each phase winding of the motor. As each of phase windings 30b and 30c of motor 30 require the same number of square wave generators and cycloconverter silicon controlled rectifier gate switches interconnected the same way as for phase winding 30a, in the interest of reducing drawing complexity, the details for motor phase windings 30b and 30c are not set forth in FIG. 1.

Assume that the common cathode group of cycloconverter silicon controlled rectifiers 13, 14 and 15, connected to the terminal end 35 of phase winding 30a, are simultaneously gated ON by respective cycloconverter silicon controlled rectifier gate switches 23, 24 and 25 and are conducting in turn, depending upon which of the three is at the most positive supply potential. Phase current will flow into terminal end 35 of phase winding 30a toward the neutral point N. As the phase current through phase winding 30a decreases over the last 90° of the positive half cycles of the supply potential, a potential is induced in phase winding 30a of a polarity relationship, neutral point N positive with respect to terminal end 35, which will tend to maintain phase current flow in the same direction. Near the end of these half cycles, cycloconverter silicon controlled rectifier gate switches 23, 24 and 25 remove the gate signals from respective cycloconverter silicon controlled rectifiers 13, 14 and 15. As each is commutated OFF by the supply potential, the phase current will try to decrease at the same rate as the applied frequency. However, due to the energy stored in the inductance of phase winding 30a, the winding will produce a potential due to L $di/dt$ of a polarity in the direction to maintain the flow of phase current, positive at the neutral point N with respect to terminal end 35. This potential polarity is in the proper direction to maintain the conduction of the cycloconverter silicon controlled rectifiers which have been conducting up to this instant. Two of the cycloconverter silicon controlled rectifiers are "off" however, due to normal commutation after gate removal, but the last cycloconverter silicon controlled rectifier still conducting will still conduct until the stored energy in the motor phase winding 30a decays to a low value.

The circuit of this invention prevents this stored energy from causing a cycloconverter silicon controlled rectifier to hang on and to eventually cause a line-to-line fault, by dissipating the potential induced in the phase winding to accelerate the decay of the current in the phase winding in a manner to be now explained.

In the cycloconverter system for cyclically energizing the phase windings of an alternating current motor from an alternating current supply potential source of FIG. 1, the circuit of this invention for dissipating the potential induced in each phase winding of the motor upon the termination of conduction therethrough is schematically set forth in combination with the cycloconverter circuit through which the phase windings of the motor are energized and a cycloconverter silicon controlled rectifier gate switch for producing a gate signal corresponding to each cycloconverter silicon controlled rectifier included in the network and comprises two silicon controlled rectifiers, each having anode, cathode and gate electrodes, two capacitors and two resistors for each phase winding of the motor with the anode-cathode electrodes of one silicon controlled rectifier in series with the parallel combination of one of the capacitors and one of the resistors and the anode-cathode electrodes of the other silicon controlled rectifier in series with the parallel combination of the other capacitor and the other resistor connected across each phase winding of the motor with the silicon controlled rectifiers poled in an opposite polarity relationship and means for producing a gate signal when conduction through each one of the phase windings of the motor is to be terminated which are applied across the gate-cathode electrodes of the one of the silicon controlled rectifiers connected across the phase winding of the motor through which conduction is to be terminated which is forward poled by the potential induced in the phase winding as the magnitude of phase current flow therethrough decreases. Silicon controlled rectifier 40 having the anode-cathode electrodes thereof in series with the parallel combination of capacitor 44 and resistor 45 is connected across phase winding 30a of motor 30 and silicon controlled rectifier 50 having the anode-cathode electrodes thereof in series with the parallel combination of capacitor 54 and resistor 55 is connected across phase winding 30a of motor 30 with the silicon controlled rectifiers poled in an opposite polarity relationship. Both phase windings 30b and 30c have this same circuitry connected thereacross.

To produce the gate signal when conduction through each one of the phase windings of motor 30 is to be terminated, a silicon controlled rectifier gate switch corresponding to each phase winding of motor 30 for producing a gate signal when conduction in a first direction through the phase winding of motor 30 to which it corresponds is to be terminated and another silicon controlled rectifier gate switch corresponding to each phase winding of motor 30 for producing a gate signal when conduction in a second opposite direction through the phase winding of motor 30 to which it corresponds is to be terminated may be employed. As these silicon controlled rectifier gate switches may be any one of the several well known in the art and, per se, form no part of this invention, each has been illustrated in FIG. 1 in block form and referenced by the numeral 46 and 56, respectively. The gate signal produced by silicon controlled rectifier gate switch 46 is applied across the gate-cathode electrodes of the one of the silicon controlled rectifiers connected across the phase winding of the motor to which it corresponds which is forward poled by the potential induced in the phase winding as the magnitude of phase current flow in a first direction therethrough decreases and the gate signal produced by silicon controlled rectifier gate switch 56 is applied across the gate-cathode electrodes of the one of the silicon controlled rectifiers connected across the phase winding of the motor to which it corresponds which is forward poled by the potential induced in the phase winding as the magnitude of phase current flow in a second opposite direction therethrough decreases. Upon the termination of conduction through phase winding 30a from terminal end 35 to neutral point N, the resulting induced potential is of a positive polarity upon junction 47 with respect to junction 57 and upon the termination of conduction through phase winding 30a of motor 30 in a second opposite direction from neutral point N toward terminal end 35, the resulting induced potential is of a positive polarity upon junction 57 with respect to junction 47. Consequently, the gate signal produced by silicon controlled rectifier gate switch 46 is applied, through respective leads 48 and 49, across the gate-cathode electrodes of silicon controlled rectifier 40 which is forward poled by the potential induced in phase winding 30a upon the termination of conduction therethrough in a first direction from terminal end 35 toward neutral point N and the gate signal produced by silicon controlled rectifier gate switch 56 is applied, through respective leads 58 and 59, across the gate-cathode electrodes of silicon controlled rectifier 50 which is forward poled by the potential induced in phase winding 30a upon the termination of conduction therethrough in a second opposite direction from neutral point N toward terminal 35.

Without intention or inference of a limitation thereto, silicon controlled rectifier gate switch 46 may produce a gate signal in response to each termination of the gate signal produced by any one of the cycloconverter silicon controlled rectifier gate switches 23, 24 or 25 corresponding to the cycloconverter silicon controlled rectifiers 13, 14 and 15 which complete an energizing circuit in a first direction through phase winding 30a of motor 30 from terminal end 35 toward neutral point N. Silicon controlled rectifier gate switch 56 may produce a gate signal in response to each termination of the gate signal produced by any one of the cycloconverter silicon controlled rectifier gate switches 20, 21 or 22 corresponding to cycloconverter silicon controlled rectifiers 10, 11 and 12 which complete an energizing circuit in a second opposite direction through phase winding 30a of motor 30 from neutral point N toward terminal end 35. In FIG. 1, silicon controlled rectifier gate switch 46 has been shown to be connected to the output circuit of cycloconverter silicon controlled rectifier gate switch 25 through leads 61 and 62 and silicon controlled rectifier gate switch 56 has been shown to be connected across the output of cycloconverter silicon controlled rectifier gate switch 20 through leads 63 and 64. It is to be specifically understood that silicon controlled rectifier gate switch 46 may be connected across the output circuit of either of cycloconverter silicon controlled rectifiers 23 or 24 and that silicon controlled rectifier gate switch 56 may be connected across the output circuit of either of cycloconverter silicon controlled rectifier gate switches 21 or 22.

Silicon controlled rectifier gate switches 46 and 56 may be conventional monostable multivibrator circuits with this arrangement of the type which are triggered to the alternate state upon the application of a negative going pulse to the input circuit thereof, in which state it remains for a period of time long enough to trigger the silicon controlled rectifier across the gate-cathode electrodes of which its output signal is applied conductive.

Just prior to the termination of conduction through phase winding 30a in a first direction from terminal end 35 toward neutral point N, the magnitude of phase current flow therethrough decreases to induce a potential therein which forward poles silicon controlled rectifier 40. Consequently, the gate signal produced by silicon controlled rectifier gate switch 46 when conduction through phase winding 30a in a first direction is to be terminated triggers silicon controlled rectifier 40 conductive through the anode-cathode electrodes thereof. The potential induced in phase winding 30a upon the termination of conduction in a first direction therethrough charges capacitor 44. When capacitor 44 has become charged, silicon controlled rectifier 40 extinguishes and the charge upon capacitor 44 dissipates through resistor 45.

Just prior to the termination of conduction through phase winding 30a of motor 30 in a second opposite direction from neutral point N toward terminal end 35, the magnitude of phase current flow therethrough decreases to induce a potential therein which forward poles silicon controlled rectifier 50. Consequently, the gate signal produced by silicon controlled rectifier gate switch 56, when conduction through phase winding 30a in the second opposite direction is to be terminated, triggers silicon controlled rectifier 50 conductive through the anode-cathode electrodes thereof. The potential induced in phase winding 30a upon the termination of conduction in a second direction therethrough charges capacitor 54. When capacitor 54 has become charged, silicon controlled rectifier 50 extinguishes and the charge upon capacitor 54 is dissipated through resistor 55.

FIG. 2a illustrates the motor phase current of a cycloconverter operated motor without the circuit of this invention. The phase current rises rapidly to a maximum at which it levels. At the end of the desired conduction angle, the gate signal is removed from the conducting cycloconverter silicon controlled rectifier supplying phase current to the motor. The current decays to zero at nearly the 180° and 360° points and is modulated or rippled by the source alternator frequency. If the current does not reach zero before the 180° and 360° points at which the cycloconverter silicon controlled rectifiers which supply current to the same phase winding are gated "ON", a line-to-line short circuit would occur. FIG. 2b illustrates the motor phase current of a cycloconverter operated motor with which the circuit of this invention is used. For example, the current through phase winding 30a is shown to increase from zero toward a maximum value while the gate signal, curve 2c, produced by the cycloconverter silicon controlled rectifier gate switch corresponding to any one of the cycloconverter silicon controlled rectifiers of the common cathode group for phase winding 30a is present. In response to the fall of this gate signal, silicon controlled rectifier gate switch 46 produces a gate signal, curve 2d, for silicon controlled rectifier 40. Conducting silicon controlled rectifier 40 provides for the sharp decay of current through phase winding 30a to zero significantly before the polarity of the phase potential reverses at the 180° and 360° points, as shown in curve 2b, at which time cycloconverter silicon controlled rectifiers 10, 11 and 12 are gated ON. Consequently, the current of phase winding 30a is zero at the time cycloconverter silicon controlled rectifiers 10, 11 and 12 are gated ON, a condition which prevents a short circuit across any phase of the alternating current supply potential source 19.

While this description has been in reference to phase winding 30a of motor 30, the same circuitry and operation also applies to phase windings 30b and 30c of motor 30.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. In a cycloconverter system for cyclically energizing the phase windings of an alternating current induction motor from an alternating current supply potential source, a circuit for dissipating the potential induced in each phase winding of the motor upon the termination of conduction therethrough comprising in combination with a cycloconverter circuit made up of a network of cycloconverter silicon controlled rectifiers through which the phase windings of the motor are energized and a cycloconverter silicon controlled rectifier gate switch for producing a gate signal corresponding to each cycloconverter silicon controlled rectifier included in the network, two silicon controlled rectifiers, each having anode, cathode and gate electrodes, for each said phase winding of said motor, two capacitors for each said phase winding of said motor, two resistors for each said phase winding of said motor, means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each said phase winding of said motor with said silicon controlled rectifiers poled in an opposite polarity relationship, means for producing a gate signal when conduction through each one of said phase windings of said motor is to be terminated, and means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases.

2. In a cycloconverter system for cyclically energizing the phase windings of an alternating current induction motor from an alternating current supply potential source, a circuit for dissipating the potential induced in each phase winding of the motor upon the termination of conduction therethrough comprising in combination with a cycloconverter circuit made up of a network of cycloconverter silicon controlled rectifiers through which the phase windings of the motor are energized and a cycloconverter silicon controlled rectifier gate switch for producing a gate signal corresponding to each cycloconverter silicon controlled rectifier included in the network, two silicon controlled rectifiers, each having anode, cathode and gate electrodes, for each said phase winding of said motor, two capacitors for each said phase winding of said motor, two resistors for each said phase winding of said motor, means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each said phase winding of said motor with said silicon controlled rectifiers poled in an opposite polarity relationship, a silicon controlled rectifier gate switch for producing a gate signal when conduction through each one of said phase winding of said motor is to be terminated, and means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases.

3. In a cycloconverter system for cyclically energizing the phase windings of an alternating current induction motor from an alternating current supply potential source, a circuit for dissipating the potential induced in each phase winding of the motor upon the termination of conduction therethrough comprising in combination with a cycloconverter circuit made up of a network of cycloconverter silicon controlled rectifiers through which the phase windings of the motor are energized and a cycloconverter silicon controlled rectifier gate switch for producing a gate signal corresponding to each cycloconverter silicon controlled rectifier included in the network, two silicon controlled rectifiers, each having anode, cathode and gate electrodes, for each said phase winding of said motor, two capacitors for each said phase winding of said motor, two resistors for each said phase winding of said motor means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each said phase winding of said motor with said silicon controlled rectifiers poled in an opposite polarity relationship, a first silicon controlled rectifier gate switch corresponding to each said phase winding of said motor for producing a gate signal when conduction in a first direction through the said phase winding of said motor to which it corresponds is to be terminated, means for applying said gate signal produced by said first silicon controlled rectifier gate switch across said gate-cathode electrodes of the one of said silicon controlled rectifiers connected across the said phase winding of said motor to which said first silicon controlled rectifier gate switch corresponds which is forward poled by the potential induced in the phase winding as the magnitude of phase current flow in a first direction therethrough decreases, a second silicon controlled rectifier gate switch corresponding to each said phase winding of said motor for producing a gate signal when conduction in a second opposite direction through the said phase winding of said motor to which it corresponds is to be terminated, and means for applying said gate signal produced by said second silicon controlled rectifier gate switch across said gate-cathode electrodes of the one of said silicon controlled rectifiers connected across the said phase winding of said motor to which it corresponds which is forward poled by the potential induced in the phase winding as the magnitude of phase current flow in a second opposite direction therethrough decreases.

4. In a cycloconverter system for cyclically energizing the phase windings of an alternating current induction motor from an alternating current supply potential source, a circuit for dissipating the potential induced in each phase winding of the motor upon the termination of conduction therethrough comprising in combination with a cycloconverter circuit made up of a network of cycloconverter silicon controlled rectifiers through which the phase windings of the motor are energized and a cycloconverter silicon controlled rectifier gate switch for producing a gate signal corresponding to each cycloconverter silicon controlled rectifier included in the network, two silicon controlled rectifiers, each having anode, cathode and gate electrodes, for each said phase winding of said motor, two capacitors for each said phase winding of said motor, two resistors for each said phase winding of said motor, means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each said phase winding of said motor with said silicon controlled rectifiers poled in an opposite polarity relationship, a first silicon controlled rectifier gate switch corresponding to each said phase winding of said motor for producing a gate signal in response to each termination of the gate signal produced by any one of the said cycloconverter silicon controlled rectifier gate switches corresponding to the said cycloconverter silicon controlled rectifiers which complete an energizing circuit in a first direction through the said phase winding of said motor to which it corresponds, means for applying said gate signal produced by said first silicon controlled rectifier gate switch across said gate-cathode electrodes of the one of said silicon controlled rectifiers connected across the said phase winding of said motor to which it corresponds which is forward poled by the potential induced in the phase winding as the magnitude of phase current flow in a first direction therethrough decreases, a second silicon controlled rectifier gate switch corresponding to each said phase winding of said motor for producing a gate signal in response to each termination of the gate signal produced by any one of the said cycloconverter silicon controlled rectifier gate switches corresponding to the said cycloconverter silicon controlled rectifiers which complete an energizing circuit in a second opposite direction through the said phase winding of said motor to which it corresponds, and means for applying said gate signal produced by said second silicon controlled rectifier gate switch across said gate-cathode electrodes of the one of said silicon controlled rectifiers connected across the said phase winding of said motor to which it corresponds which is forward poled by the potential induced in the phase winding as the magnitude of phase current flow in a second opposite direction therethrough decreases.

* * * * *